United States Patent
Oh et al.

(10) Patent No.: US 9,971,549 B2
(45) Date of Patent: May 15, 2018

(54) METHOD OF OPERATING A MEMORY DEVICE

(71) Applicant: SAMSUNG ELECTRONICS CO., LTD., Suwon-si, Gyeonggi-Do (KR)

(72) Inventors: Doo-Hwan Oh, Hwaseong-si (KR); Yong-Jun Yu, Suwon-si (KR); In-Su Choi, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days. days.

(21) Appl. No.: 15/491,286

(22) Filed: Apr. 19, 2017

(65) Prior Publication Data

US 2017/0344311 A1 Nov. 30, 2017

(30) Foreign Application Priority Data

May 24, 2016 (KR) .................. 10-2016-0063414

(51) Int. Cl.
*G11C 7/00* (2006.01)
*G06F 3/06* (2006.01)

(52) U.S. Cl.
CPC .......... *G06F 3/0659* (2013.01); *G06F 3/0604* (2013.01); *G06F 3/0608* (2013.01); *G06F 3/0652* (2013.01); *G06F 3/0656* (2013.01); *G06F 3/0683* (2013.01)

(58) Field of Classification Search
CPC ....... G11C 7/1078; G11C 7/1006; G11C 7/22; G11C 7/1072; G11C 7/1096

USPC .......................... 365/189.14, 189.16, 189.2
See application file for complete search history.

(56) References Cited

U.S. PATENT DOCUMENTS

| | | | |
|---|---|---|---|
| 7,287,115 B2 * | 10/2007 | Otani | G11C 5/04 257/E25.013 |
| 7,830,732 B2 | 11/2010 | Moshayedi et al. | |
| 8,751,760 B2 | 6/2014 | Sauber et al. | |
| 8,874,831 B2 | 10/2014 | Lee et al. | |
| 8,930,647 B1 | 1/2015 | Smith | |
| 2006/0294295 A1 | 12/2006 | Fukuzo | |
| 2012/0159045 A1 | 6/2012 | Hinkle et al. | |
| 2014/0181364 A1 | 6/2014 | Berke et al. | |
| 2014/0237176 A1 | 8/2014 | Takefman et al. | |
| 2014/0281151 A1 | 9/2014 | Yu et al. | |
| 2014/0281152 A1 | 9/2014 | Karamcheti et al. | |
| 2015/0074339 A1 | 3/2015 | Cheriton | |

* cited by examiner

*Primary Examiner* — Son Dinh

(74) *Attorney, Agent, or Firm* — F. Chau & Associates, LLC

(57) ABSTRACT

In a method of operating a memory device, a first write command, a first write address, and first write data are received by a first memory device through a channel. The first write command, received by the first memory device, is sensed by a controller. The controller is connected to the channel and controls a second memory device. The first memory device and the second memory device are different types of memory devices. When the first write command is sensed by the controller, a first write log is generated using the first write address and the first write data. The first write log is stored into a buffer.

20 Claims, 13 Drawing Sheets

METHOD OF OPERATING A MEMORY DEVICE

CROSS-REFERENCE TO RELATED APPLICATION

This application claims priority under 35 U.S.C. § 119 to Korean Patent Application No. 10-2016-0063414, filed on May 24, 2016 in the Korean Intellectual Property Office (KIPO), the disclosure of which is incorporated by reference herein in its entirety.

TECHNICAL FIELD

Exemplary embodiments of the inventive concept relate to semiconductor memory devices, and more particularly, to methods of operating memory devices.

DISCUSSION OF RELATED ART

Semiconductor memory devices can be generally divided into two categories depending upon whether they retain stored data when disconnected from power. These two categories are volatile memory devices, which lose stored data when disconnected from power, and nonvolatile memory devices, which retain stored data when disconnected from power. Data write and/or read operations of volatile memory devices may be different from data write and/or read operations of nonvolatile memory devices.

SUMMARY

According to an exemplary embodiment of the inventive concept, in a method of operating a memory device, a first write command, a first write address, and first write data are received at a first memory device through a channel. The first write command received at the first memory device is sensed at a controller. The controller is connected to the channel and is configured to control a second memory device. The first memory device and the second memory device are different types of memory devices. When the first write command is sensed by the controller, a first write log is generated using the first write address and the first write data. The first write log is stored in a buffer.

According to an exemplary embodiment of the inventive concept, in a method of operating a memory device, a first write command, a first write address, and first write data are transmitted to a first memory device. The first write command that is transmitted to the first memory device is sensed and a sensing signal is activated. The first write address, corresponding to the first memory device, is mapped to a second write address, corresponding to a second memory device, in response to the sensing signal. A first flag is set to a first or second logic level depending on whether it is required to store the first write data into the second memory device. A first write log, including the first flag, the second write address, and the first write data, is generated. The first write log is stored in a buffer by using a buffer management table.

According to an exemplary embodiment of the inventive concept, a memory system includes a first memory device, a controller, and a buffer. The first memory device is connected to a channel, and is configured to receive a first write command, a first write address, and first write data through the channel. The controller is connected to the channel, and is configured to control a second memory device, sense the first write command received by the first memory device, and when the first write command is sensed, generate a first write log using the first write address and the first write data. The buffer is configured to store the first write log. The first memory device and the second memory device are different types of memory devices.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
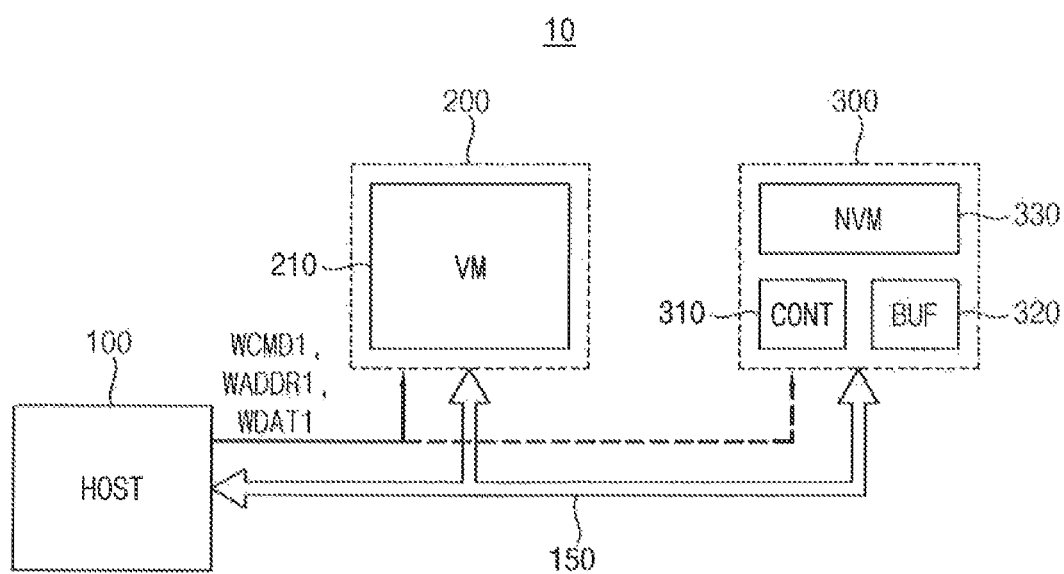
FIG. 1 is a block diagram illustrating a memory system including a memory device according to an exemplary embodiment of the inventive concept.

Exemplary embodiments of the inventive concept will be described more fully hereinafter with reference to the accompanying drawings. Like reference numerals may refer to like elements throughout this application.

Exemplary embodiments of the inventive concept provide, in a memory system including different types of memory devices, a method of operating memory devices associated with data write operations.

FIG. 1 is a block diagram illustrating a memory system including a memory device according to an exemplary embodiment of the inventive concept.

Referring to FIG. 1, a memory system 10 includes a channel 150, a first storage 200, and a second storage 300. The first storage 200 includes a first memory device 210. The second storage 300 includes a controller 310, a buffer 320, and a second memory device 330. The memory system 10 may further include a host 100.

The host 100 may be electrically connected to the channel 150 and may control overall operations of the memory system 10. For example, the host 100 may include a memory controller and may control data write/read operations for at least one of the first memory device 210 and the second memory device 330.

According to exemplary embodiments of the inventive concept, the host 100 may perform various computing functions, such as executing specific software for performing specific calculations or tasks. For example, the host 100 may execute an operating system (OS) and/or applications. Additionally, the host 100 may include a central processing unit (CPU), a microprocessor, an application processor (AP), etc.

The first memory device 210 is electrically connected to the channel 150. For example, the first memory device 210 may include a volatile memory device, e.g., a dynamic random access memory (DRAM).

The controller 310 is electrically connected to the channel 150. The buffer 320 is electrically connected to the controller 310 and stores information (e.g., write logs) provided from the controller 310. The controller 310 and the buffer 320 control the second memory device 330. The first memory device 210 and the second memory device 330 are different types of memory devices. For example, the second memory device 330 may include a nonvolatile memory device, e.g., a flash memory, a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

In the memory system 10 according to an exemplary embodiment of the inventive concept, the first storage 200 and the second storage 300 may be electrically connected to each other through the channel 150. The first memory device 210 and the second memory device 330 may also be electrically connected to each other through the channel 150. In other words, a single channel (e.g., the channel 150) may be shared by the first storage 200 and the second storage 300, and may be shared by the first memory device 210 and the second memory device 330.

According to exemplary embodiments of the inventive concept, commands, addresses, and data may be transmitted through the channel 150 using a deterministic interface. In the deterministic interface, data (e.g., write data) may be transmitted or provided within a predetermined duration after commands (e.g. a write command) are generated or received.

According to exemplary embodiments of the inventive concept, the first memory device 210 may operate using the deterministic interface. For example, if the first memory device 210 includes a DRAM, the deterministic interface may correspond to a DRAM interface. The first memory device 210 may communicate directly with (and thus, have a direct interface with) the memory controller included in the host 100. According to an exemplary embodiment of the inventive concept, commands, addresses, and data may be transmitted from the memory controller to the first memory device 210, and the first memory device 210 may be accessed by directly using these commands, addresses, and data. For example, when a first write command WCMD1 is received by the first memory device 210, the first memory device 210 may store first write data WDAT1 into a memory location identified by a first write address WADDR1. The commands may be a certain type of access command. For example, if the first memory device 210 is a DRAM, standard DRAM signals, including DRAM-type commands, may be sent from the memory controller to the first memory device 210.

According to exemplary embodiments of the inventive concept, the second memory device 330 may operate using a nondeterministic interface. In the nondeterministic interface, packets including data may be transmitted to or received from the second memory device 330, and the data is not transmitted or provided within the predetermined duration after the commands are generated (as occurs in the deterministic interface). Since commands, addresses, and data are transmitted through the channel 150 using the deterministic interface, the second storage 300 may further include a conversion block (e.g., a memory abstraction block) that converts the deterministic interface into the nondeterministic interface. For example, the second memory device 330 of the second storage 300 may communicate indirectly through the conversion block, to have an indirect interface with the memory controller. The conversion block may be located inside the controller 310 or the buffer 320.

According to exemplary embodiments of the inventive concept, as will be described below with reference to FIG. 9, the first storage 200 including the first memory device 210 may be implemented as one memory module, and the second storage 300 including the controller 310, the buffer 320, and the second memory device 330 may be implemented as another memory module. According to exemplary embodiments of the inventive concept, as will be described below with reference to FIG. 11, the first memory device 210, the controller 310, the buffer 320, and the second memory device 330 may be implemented as a single memory module.

Hereinafter, an operation of the memory device, according to an exemplary embodiment of the inventive concept, will be described in detail based on an example where the first write command WCMD1, the first write address WADDR1, and the first write data WDAT1 are provided from the host 100 to the first storage 200.

Figure 2:
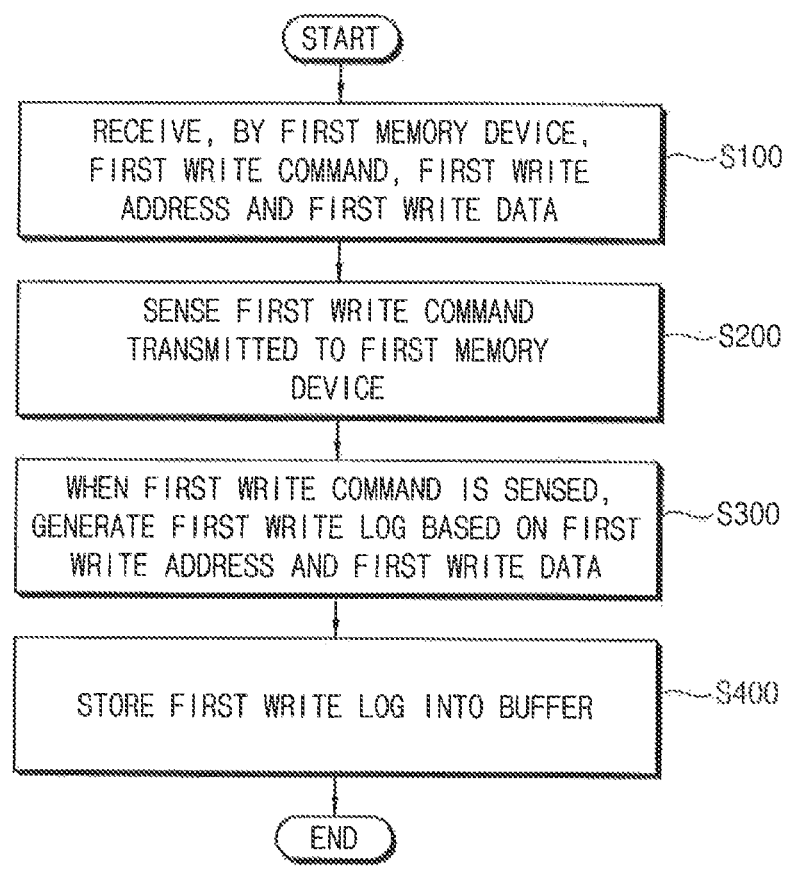
FIG. 2 is a flowchart illustrating a method of operating a memory device according to an exemplary embodiment of the inventive concept.

FIG. 2 is a flowchart illustrating a method of operating a memory device according to an exemplary embodiment of the inventive concept.

Referring to FIGS. 1 and 2, in a method of operating a memory device according to an exemplary embodiment of the inventive concept, the first memory device 210 receives the first write command WCMD1, the first write address WADDR1, and the first write data WDAT1 through the channel 150 (operation S100). For example, the first write command WCMD1, the first write address WADDR1, and the first write data WDAT1 may be generated from the host 100.

The first write command WCMD1, the first write address WADDR1, and the first write data WDAT1 may be generated to perform a data write operation for the first memory device 210. According to an exemplary embodiment of the inventive concept, the host 100 may further generate a first chip selection signal for enabling the first memory device 210 and a second chip selection signal for enabling the second memory device 330. The host 100 may transmit the first write command WCMD1, the first write address WADDR1, and the first write data WDAT1 to the first memory device 210 through the channel 150 while the first chip selection signal is activated.

The controller 310 senses the first write command WCMD1 that is transmitted to the first memory device 210 (operation S200). As described with reference to FIG. 1, the channel 150 may be shared by the first memory device 210 and the second memory device 330, and the controller 310 may be electrically connected to the channel 150. Thus, the controller 310 may sense or detect the first write command WCMD1 transmitted through the channel 150 even if the second chip selection signal is not activated. This operation of sensing the first write command WCMD1 by the controller 310 may be referred to as a sneaking operation or a secret capturing operation.

Additionally, operations S100 and S200 may be substantially simultaneously or concurrently performed.

When the first write command WCMD1 is sensed by the controller 310, the controller 310 generates a first write log based on the first write address WADDR1 and the first write data WDAT1 (operation S300), and stores the first write log into the buffer 320 (operation S400). For example, the first memory device 210 may operate as a cache memory of the second memory device 330, and the first write log may represent a history of data modification of the cache memory.

According to an exemplary embodiment of the inventive concept, the first memory device 210 may store the first write data WDAT1 based on the first write command WCMD1 and the first write address WADDR1. For example, an operation of storing the first write data WDAT1 into the first memory device 210 may be performed after operation S100 and before operation S300, or may be performed substantially simultaneously or concurrently with at least one of operations S300 or S400.

Figure 3:
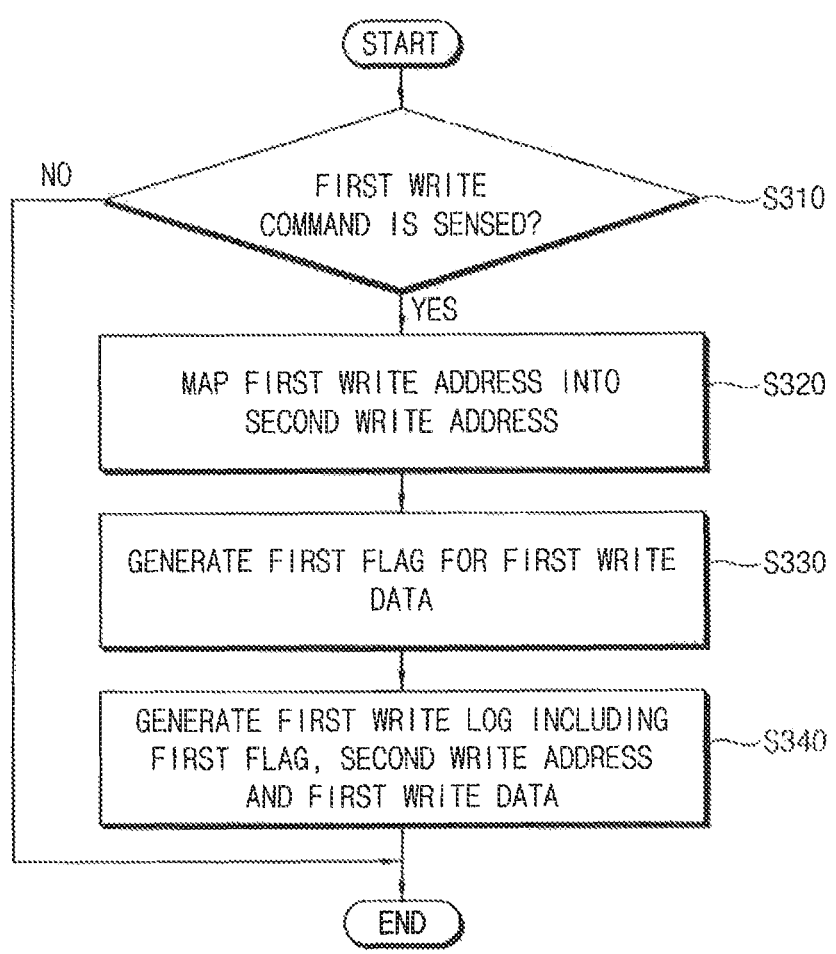
FIG. 3 is a flowchart illustrating an operation of FIG. 2 of generating a first write log.
Figure 4:
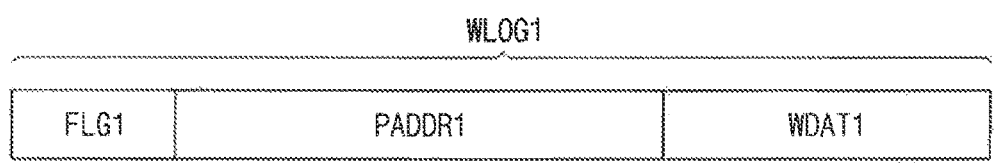
FIG. 4 is a diagram illustrating the first write log generated by the operation of FIG. 3 according to an exemplary embodiment of the inventive concept.

FIG. 3 is a flowchart illustrating an operation of FIG. 2 of generating a first write log according to an exemplary embodiment of the inventive concept. FIG. 4 is a diagram illustrating the first write log generated by the operation of FIG. 3 according to an exemplary embodiment of the inventive concept.

Referring to FIGS. 1, 2, 3, and 4, in generating a first write log WLOG1 (e.g., in operation S300 of FIG. 2), it may be determined whether the first write command WCMD1 is sensed by the controller 310 (operation S310).

When the first write command WCMD1 is sensed (operation S310: YES), the controller 310 may map the first write address WADDR1 into a second write address PADDR1 (operation S320). For example, the first write address WADDR1 may correspond to a storage location in the first memory device 210, and the second write address PADDR1 may correspond to a storage location in the second memory device 330.

According to exemplary embodiments of the inventive concept, if the first memory device 210 includes a DRAM, the first write address WADDR1 may be a DRAM address. For example, the first write address WADDR1 may include a rank identification (ID), a bank ID, a row ID, etc.

According to exemplary embodiments of the inventive concept, the second write address PADDR1 may be a physical address. For example, if the second memory device 330 includes a block addressable memory device, e.g., a NAND flash memory device, the second write address PADDR1 may include a block ID, an offset corresponding to a block, etc.

The controller 310 may generate a first flag FLG1 for the first write data WDAT1 (operation S330). The first flag FLG1 may include information that represents whether it is required to store the first write data WDAT1 into the second memory device 330. For example, when it is not required to store the first write data WDAT1 into the second memory device 330, the first flag FLG1 may be set to a first logic level (e.g., "0"). When it is required to store the first write data WDAT1 into the second memory device 330, the first flag FLG1 may be set to a second logic level (e.g., "1") that is different from the first logic level.

According to exemplary embodiments of the inventive concept, when the first write data WDAT1 is stored and maintained in the first memory device 210, the first flag FLG1 may be set to the first logic level. In an initial operation time in which the first write log WLOG1 is initially generated, there may be a higher chance of maintaining or retaining the first write data WDAT1 in the first memory device 210, and then, it may not be required to also store the first write data WDAT1 in the second memory device 330. Thus, an initial value of the first flag FLG1 may be set to the first logic level.

According to exemplary embodiments of the inventive concept, when the first write data WDAT1 is not stored in the first memory device 210 and is deleted, erased, or removed from the first memory device 210 (e.g., when the first write data WDAT1 is moved from the first memory device 210 to other storage), the first flag FLG1 may be changed from the first logic level to the second logic level. In the method of operating the memory device according to an exemplary embodiment of the inventive concept, the first flag FLG1 of the first write log WLOG1 stored in the buffer 320 may be selectively updated (or changed) after operation S400, and then, the first write data WDAT1 may be stored in the second memory device 330 based on the first flag FLG1 of the first write log WLOG1 (e.g., operation S500 in FIG. 7). As will be described below with reference to FIGS. 7 and 8, the first write data WDAT1 may be stored in the second memory device 330 after a certain amount of time has elapsed from a time point at which the first flag FLG1 is changed to the second logic level. In other words, the first write data WDAT1 is not stored in the second memory device 330 immediately after the first flag FLG1 is changed to the second logic level.

As illustrated in FIG. 4, the controller 310 may generate the first write log WLOG1 that includes the first flag FLG1, the second write address PADDR1, and the first write data WDAT1 (operation S340). For example, the first flag FLG1 may be 1 bit of data representing the first or second logic level, the second write address PADDR1 may include 26 bits of data representing the block ID and 6 bits of data representing the offset, and the first write data WDAT1 may be 64 bytes of data.

When the first write command WCMD1 is not sensed (operation S310: NO), the first write log WLOG1 is not generated, and thus is not stored in the buffer 320.

Figure 5:
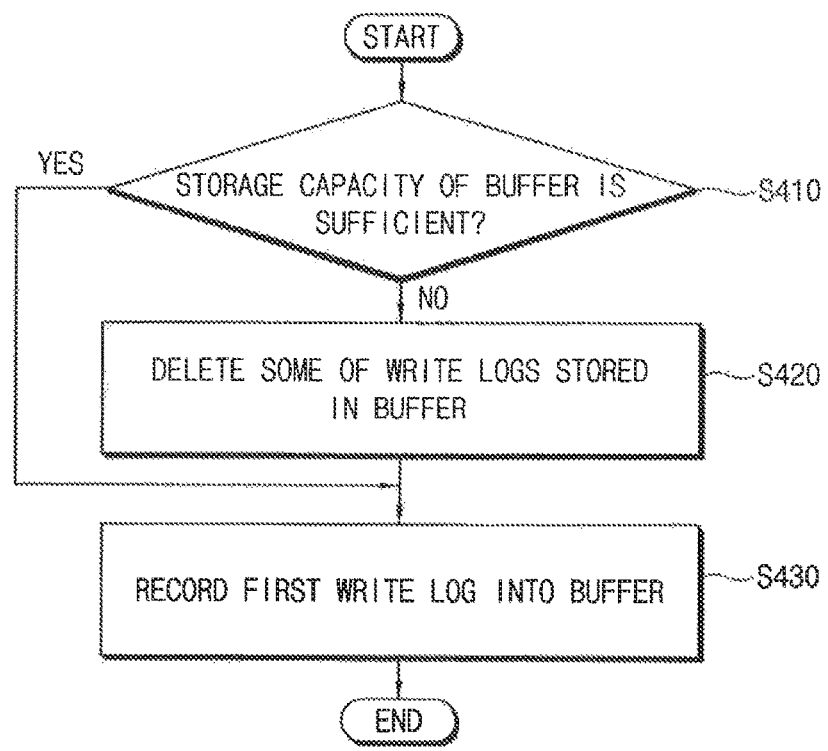
FIG. 5 is a flowchart illustrating an operation of FIG. 2 of storing the first write log into a buffer according to an exemplary embodiment of the inventive concept.

FIG. 5 is a flowchart illustrating an operation of FIG. 2 of storing the first write log into the buffer according to an exemplary embodiment of the inventive concept.

Referring to FIGS. 1, 2, 4, and 5, in storing the first write log WLOG1 into the buffer 320 (e.g., in operation S400 of FIG. 2), a storage capacity of the buffer 320 may be checked (operation S410).

When it is determined that the storage capacity of the buffer 320 is insufficient to store the first write log WLOG1 (operation S410: NO) (e.g., when the buffer 320 is full from storing a plurality of write logs), some of the plurality of write logs stored in the buffer 320 may be deleted, erased, or removed (operation S420).

Similar to the first write log WLOG1, each of the plurality of write logs stored in the buffer 320 may include a flag, a write address (e.g., a physical address), and write data. The plurality of write logs stored in the buffer 320 may be divided into a first group of write logs where the flag is set to the first logic level and a second group of write logs where the flag is set to the second logic level.

According to exemplary embodiments of the inventive concept, in deleting some of the plurality of write logs stored in the buffer 320 (e.g., in operation S420 of FIG. 5), at least one write log, included in the first group where the flag is set to the first logic level, may be deleted. In other words, in operation S420, at least one write log that is stored in the buffer 320 and is not required to be stored in the second memory device 330 may be deleted.

According to exemplary embodiments of the inventive concept, a least recently used (LRU) policy may be used for deleting the at least one write log included in the first group. For example, a least recently used or oldest write log included in the first group may be deleted.

When it is determined that the storage capacity of the buffer 320 is sufficient to store the first write log WLOG1 (operation S410: YES) or after some of the plurality of write logs stored in the buffer 320 are deleted (e.g., after operation S420), the first write log WLOG1 may be recorded into the buffer 320 (operation S430). In other words, the first write log WLOG1 may be stored in the buffer 320 when the buffer 320 has sufficient storage capacity or space.

Figure 6:
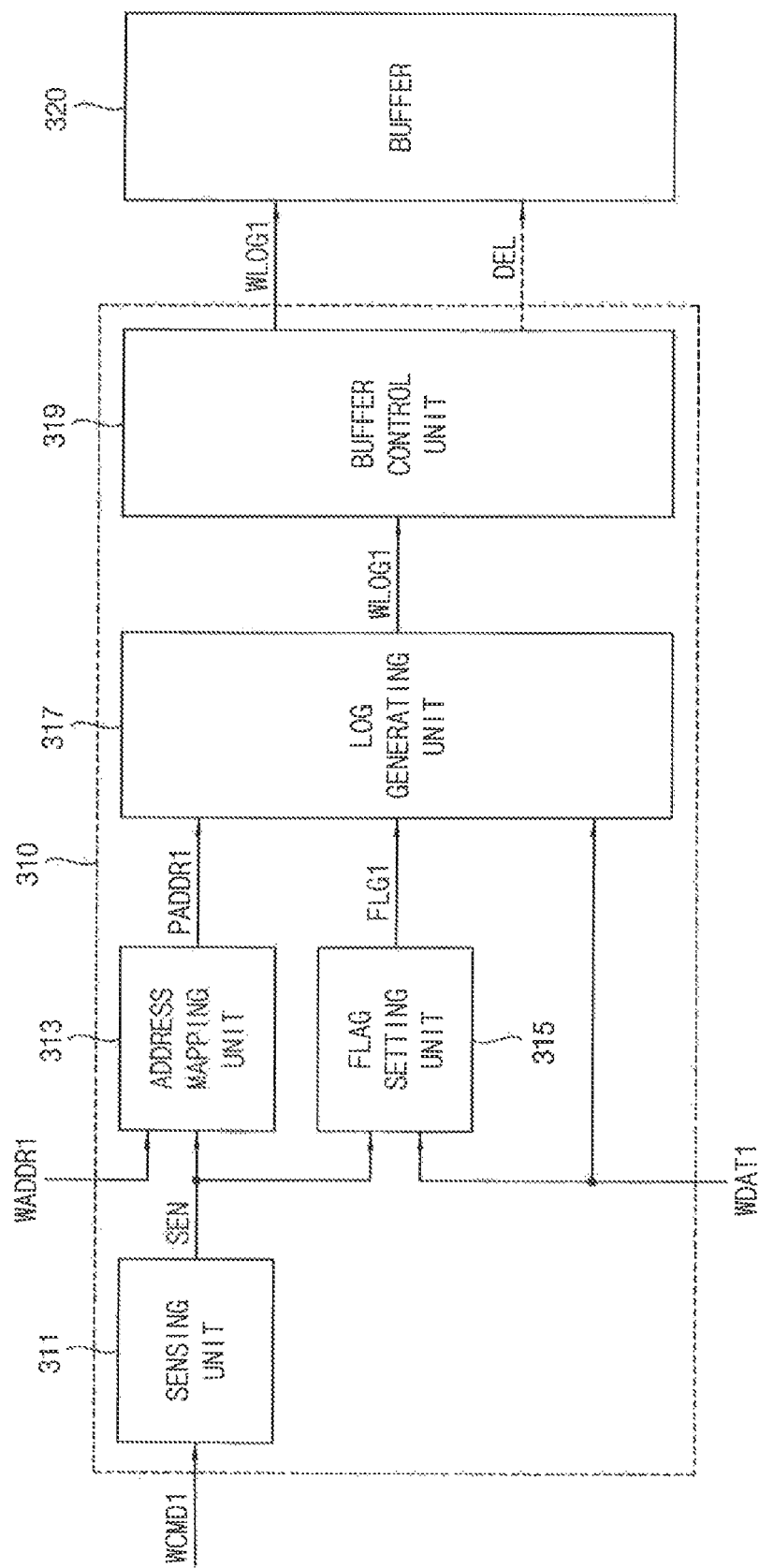
FIG. 6 is a block diagram illustrating a controller that controls the memory device of FIG. 1 according to an exemplary embodiment of the inventive concept.

FIG. 6 is a block diagram illustrating a controller that controls the memory device of FIG. 1 according to an exemplary embodiment of the inventive concept.

Referring to FIGS. 1 and 6, the controller 310 may include a sensing unit 311, an address mapping unit 313, a flag setting unit 315, a log generating unit 317, and a buffer control unit 319.

The sensing unit 311 may be electrically connected to the channel 150 of FIG. 1. The sensing unit 311 may sense or detect the first write command WCMD1 that is transmitted to the first memory device 210 through the channel 150. When the first write command WCMD1 is sensed, the sensing unit 311 may activate a sensing signal SEN.

When the first write command WCMD1 is sensed, e.g., when the sensing signal SEN is activated, the address mapping unit 313 may map the first write address WADDR1 corresponding to the first memory device 210 to the second write address PADDR1 corresponding to the second memory device 330. For example, as described with reference to FIG. 3, the first write address WADDR1 may be a DRAM address, and the second write address PADDR1 may be a physical address. Additionally, the address mapping unit 313 may include an address mapping table for the mapping operation.

When the first write command WCMD1 is sensed, the flag setting unit 315 may generate the first flag FLG1 for the first write data WDAT1. For example, as described with reference to FIG. 3, the first flag FLG1 may be set to the first logic level when it is not required to store the first write data WDAT1 in the second memory device 330, and the first flag FLG1 may be set to the second logic level when it is required to store the first write data WDAT1 in the second memory device 330.

According to exemplary embodiments of the inventive concept, when the first write data WDAT1 is stored and maintained in the first memory device 210, the first flag FLG1 may be set to the first logic level. When the first write data WDAT1 is not stored in the first memory device 210 and is deleted, erased, or removed from the first memory device 210, the first flag FLG1 may be changed from the first logic level to the second logic level. The controller 310 may further include a flag updating unit for selectively updating (or changing) the first flag FLG1 after the first write log WLOG1 is stored in the buffer 320.

According to exemplary embodiments of the inventive concept, the first write address WADDR1 and the first write data WDAT1 may be provided directly from the channel 150 or from the sensing unit 311.

When the first write command WCMD1 is sensed, the log generating unit 317 may generate the first write log WLOG1 including the first flag FLG1, the second write address PADDR1, and the first write data WDAT1.

When the first write command WCMD1 is sensed, the buffer control unit 319 may check the storage capacity of the buffer 320. When the storage capacity of the buffer 320 is insufficient to store the first write log WLOG1, the buffer control unit 319 may delete some of the plurality of write logs stored in the buffer 320. When the storage capacity of the buffer 320 is sufficient to store the first write log WLOG1, the buffer control unit 319 may record the first write log WLOG1 into the buffer 320. For example, as described with reference to FIG. 5, when the storage capacity of the buffer 320 is insufficient, at least one write log, included in the first group where the flag is set to the first logic level, may be deleted. As described above, the LRU policy may be used for deleting the at least one write log included in the first group. The buffer control unit 319 may activate a signal DEL for deleting some of the plurality of write logs stored in the buffer 320. Additionally, the buffer control unit 319 may include a buffer management table for the storing operation.

Although FIG. 6 illustrates an example where the buffer control unit 319 is included in the controller 310, the buffer control unit may instead be included in the buffer 320.

According to exemplary embodiments of the inventive concept, at least a part of the elements 311, 313, 315, 317, and 319 included in the controller 310 of FIG. 6 may be implemented as hardware. Alternatively, at least a part of the elements 311, 313, 315, 317, and 319 included in the controller 310 of FIG. 6 may be implemented as instructions or program routines (e.g., a software program) that are executed by a processor and are stored in a storage.

In the method of operating the memory device according to an exemplary embodiment of the inventive concept, when the first memory device 210 receives the first write command WCMD1 (e.g., while the first memory device 210 stores the first write data WDAT1), information associated with the first write address WADDR1 and the first write data WDAT1 may be recorded (e.g., logged) by the controller 310 for controlling the second memory device 330 and may be stored in the buffer 320. Accordingly, it may be efficiently traced or recognized which data is modified among data stored in the first memory device 210, and thus, the modified data (or the latest data) may be maintained or retained without having to transmit the modified data from the first memory device 210.

Figure 7:
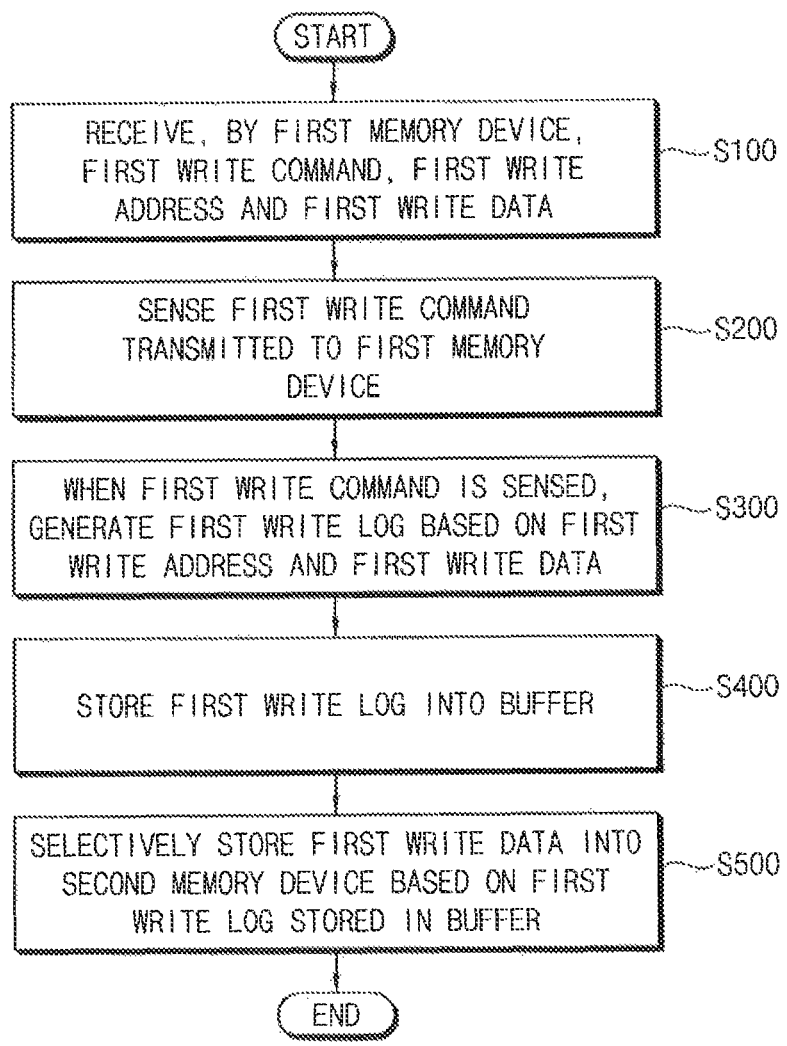
FIG. 7 is a flowchart illustrating a method of operating a memory device according to an exemplary embodiment of the inventive concept.

FIG. 7 is a flowchart illustrating a method of operating a memory device according to an exemplary embodiment of the inventive concept.

Referring to FIGS. 1, 4, and 7, in a method of operating a memory device according to an exemplary embodiment of the inventive concept, the first memory device 210 receives the first write command WCMD1, the first write address WADDR1, and the first write data WDAT1 through the channel 150 (operation S100). The controller 310 senses the first write command WCMD1 that is transmitted to the first memory device 210 (operation S200). When the first write command WCMD1 is sensed by the controller 310, the controller 310 generates the first write log WLOG1 based on the first write address WADDR1 and the first write data WDAT1 (operation S300), and stores the first write log WLOG1 into the buffer 320 (operation S400). Operations S100, S200, S300, and S400 in FIG. 7 may be substantially the same as operations S100, S200, S300, and S400 in FIG. 2, respectively.

The first write data WDAT1 may be selectively stored into the second memory device 330 based on the first write log WLOG1 stored in the buffer 320 (operation S500). For example, the first write data WDAT1 may be or may not be stored into the second memory device 330 based on the first flag FLG1 included in the first write log WLOG1.

Figure 8:
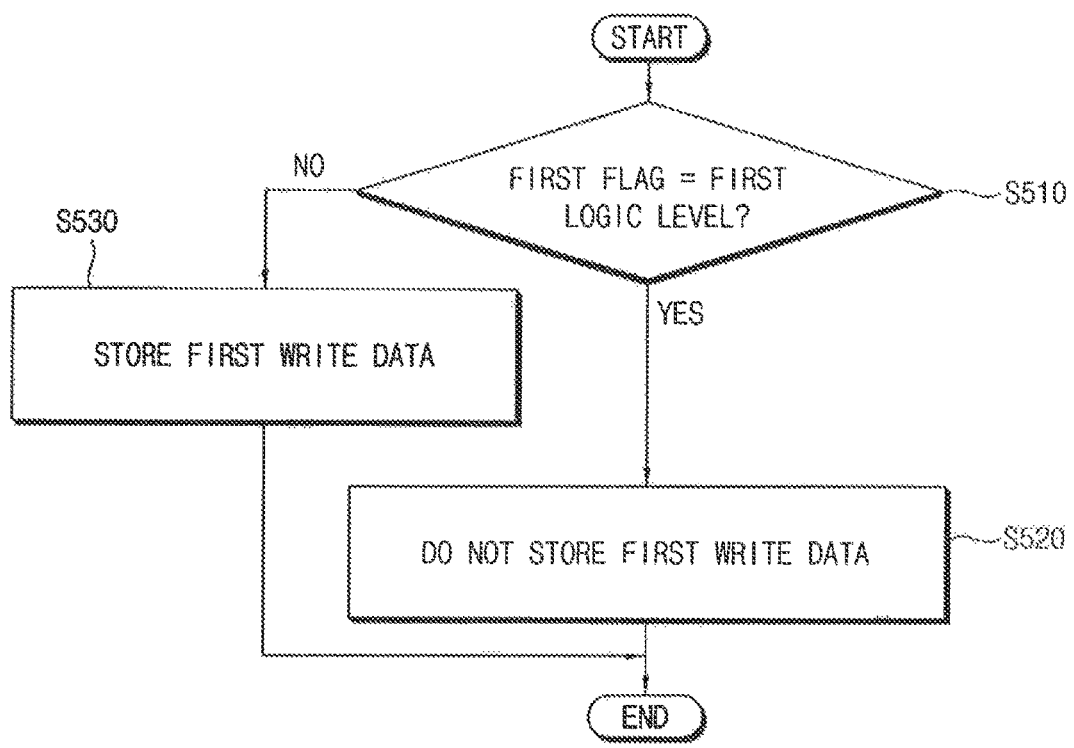
FIG. 8 is a flowchart illustrating an operation of FIG. 7 of selectively storing a first write data into a second memory device according to an exemplary embodiment of the inventive concept.

FIG. 8 is a flowchart illustrating an operation of FIG. 7 of selectively storing a first write data into a second memory device according to an exemplary embodiment of the inventive concept.

Referring to FIGS. 1, 7, and 8, in selectively storing the first write data WDAT1 into the second memory device 330 (e.g., in operation S500 of FIG. 7), a logic level of the first flag FLG1 may be checked (operation S510).

When the first flag FLG1 is set to the first logic level (operation S510: YES) (e.g., when it is not required to store the first write data WDAT1 into the second memory device 330), the first write data WDAT1 is not transmitted from the buffer 320 to the second memory device 330, and thus, the first write data WDAT1 is not stored into the second memory device 330 (operation S520).

When the first flag FLG1 is set to the second logic level (operation S510: NO) (e.g., when it is required to store the first write data WDAT1 into the second memory device 330), the first write data WDAT1 may be stored into the second memory device 330 by directly transmitting the first write data WDAT1 from the buffer 320 to the second memory device 330 based on the second write address PADDR1 (operation S530).

According to exemplary embodiments of the inventive concept, operation S500 in FIG. 7 and operations S510, S520, and S530 in FIG. 8 may be performed based on a first command. For example, when the first command is sensed, the sensing unit 311 of FIG. 6, included in the controller 310, may activate a buffer write signal and provide the activated buffer write signal to the buffer 320. The buffer 320 may selectively transmit the first write data WDAT1 to the second memory device 330 based on the activated buffer write signal.

According to exemplary embodiments of the inventive concept, the first command may be provided from the host 100 and may be a command for entering a low power mode (e.g., a sleep mode, a deep power down (DPD) mode, etc.). In other words, when the memory system 10 (or the first and second memory devices 210 and 330) enters the low power mode, the first write data WDAT1 may be selectively stored into the second memory device 330. According to exemplary embodiments of the inventive concept, the first command may be a command for emptying (e.g., flushing) the buffer 320. For example, when the buffer 320 is full of the second group of write logs for which the flag is set to the second logic level, the buffer control unit 319 of FIG. 6 may activate an acknowledge signal representing a full status of the buffer 320 and provide the activated acknowledge signal to the host 100. The host 100 may generate the first command based on the activated acknowledge signal. According to exemplary embodiments of the inventive concept, the first command may be generated in any situation where data in the buffer 320 is to be stored into the second memory device 330.

Although FIGS. 7 and 8 illustrate an example where only the first write data WDAT1 is selectively stored into the second memory device 330, operations S510, S520, and S530 may be performed for all of the plurality of write logs stored in the buffer 320. After all write data included in the second group of write logs, in which the flag is set to the second logic level, is stored into the second memory device 330, the write logs stored in the buffer 320 may be deleted in response to a certain command or without any additional commands.

In the method of operating the memory device according to an exemplary embodiment of the inventive concept, when the first memory device 210 receives the first write command WCMD1, information associated with the first write address WADDR1 and the first write data WDAT1 may be recorded (e.g., logged) by the controller 310 for controlling the second memory device 330, and may be stored into the buffer 320. The write data may be collected or accumulated in the buffer 320, and then the collected or accumulated data may be stored into the second memory device 330 at one time in a certain situation (e.g., in the low power mode). Accordingly, the number of data write operations for the second memory device 330 may be reduced, and thus, the second memory device 330 may have relatively high endurance. In addition, the write data may be directly transmitted from the buffer 320 to the second memory device 330 without going through the first memory device 210 and/or the host 100, and thus, the memory system 10 may have relatively increased performance and high data transmission efficiency.

Figure 9:
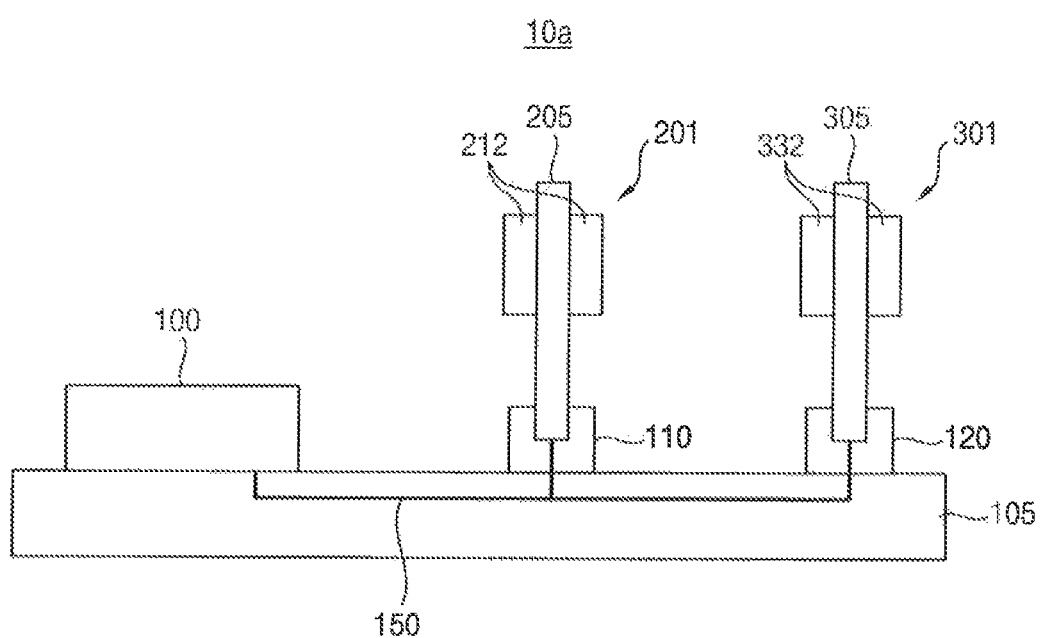
FIG. 9 is a cross-sectional view of a memory system including a memory device according to an exemplary embodiment of the inventive concept.

FIG. 9 is a cross-sectional view of a memory system including a memory device according to an exemplary embodiment of the inventive concept.

Referring to FIG. 9, a memory system 10a may include the host 100, a first memory module 201, and a second memory module 301 that are mounted on a base substrate 105.

As an example, referring to FIGS. 1 and 9, the first memory device 210 may be included in the first memory module 201, and the controller 310, the buffer 320, and the second memory device 330 may be included in the second memory module 301.

The base substrate 105 may be, for example, a printed circuit board (PCB). A plurality of sockets 110 and 120 may be formed on the base substrate 105. Each memory module may be inserted in one of the plurality of sockets 110 and 120. For example, the first memory module 201 may be inserted in the first socket 110, and the second memory module 301 may be inserted in the second socket 120.

The first memory module 201 may include a first substrate 205 and a plurality of first memory chips 212 that are mounted on the first substrate 205. The first memory module 201 may correspond to the first storage 200 in FIG. 1, and the plurality of first memory chips 212 may correspond to the first memory device 210 in FIG. 1. For example, each of the first memory chips 212 may include a volatile memory device, e.g., a DRAM.

The second memory module 301 may include a second substrate 305 and a plurality of second memory chips 332 that are mounted on the second substrate 305. The second memory module 301 may further include the controller 310 and the buffer 320 of FIG. 1. The second memory module 301 may correspond to the second storage 300 in FIG. 1, and the plurality of second memory chips 332 may correspond to the second memory device 330 in FIG. 1. For example, each of the second memory chips 332 may include a nonvolatile memory device, e.g., a flash memory.

According to exemplary embodiments of the inventive concept, the first memory module 201 may be a dual in-line memory module (DIMM) in which the plurality of first memory chips 212 are mounted on both surfaces of the first substrate 205. For example, the first memory module 201 may be a volatile DIMM (VDIMM). Similarly, the second memory module 301 may be a DIMM in which the plurality of second memory chips 332 are mounted on both surfaces of the second substrate 305. For example, the second memory module 301 may be a nonvolatile DIMM (NVDIMM).

According to exemplary embodiments of the inventive concept, each of the first substrate 205 and the second substrate 305 may be a PCB.

The channel 150 may be formed in the base substrate 105. The first memory module 201 and the second memory module 301 may be electrically connected to each other through the channel 150. In other words, a single channel (e.g., the channel 150) may be shared by the first memory module 201 and the second memory module 301.

Figure 10A:
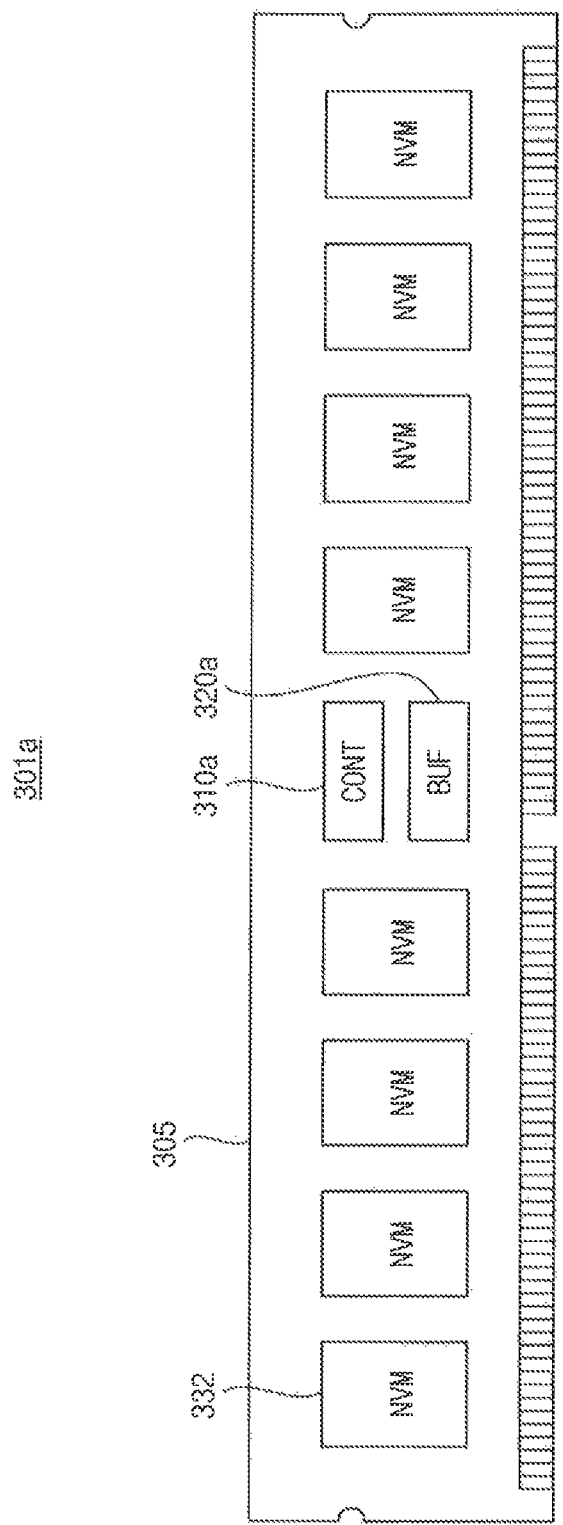
FIGS. 10A and 10B are plan views of a memory module included in the memory system of FIG. 9 according to exemplary embodiments of the inventive concept.
Figure 10B:
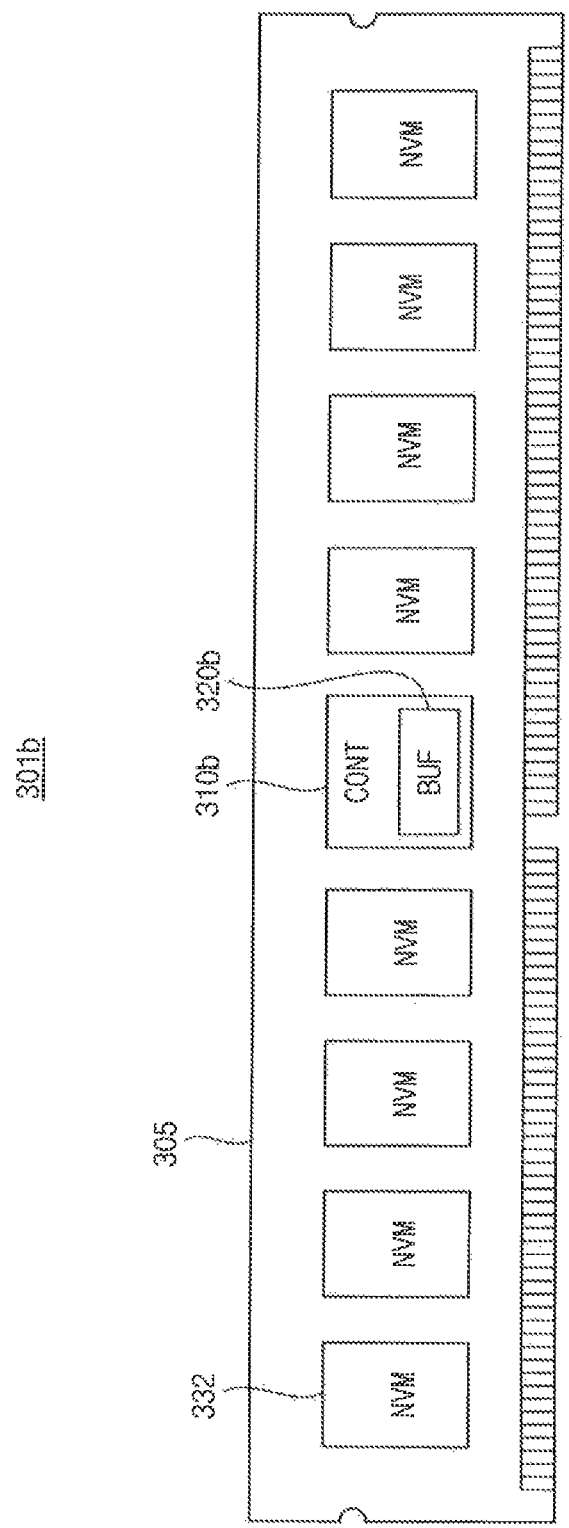

FIGS. 10A and 10B are plan views of a memory module included in the memory system of FIG. 9 according to exemplary embodiments of the inventive concept.

Referring to FIG. 10A, a second memory module 301a may include a controller 310a, a buffer 320a, and the plurality of second memory chips 332 that are mounted on a first surface of the second substrate 305.

The controller 310a and the buffer 320a may be mounted on a central region of the second substrate 305. The plurality of second memory chips 332 may be mounted on the second substrate 305 and may be adjacent to the controller 310a and the buffer 320a. Although FIG. 10A illustrates the memory module 301a including eight memory chips 332 that are symmetrically arranged with respect to the controller 310a and the buffer 320a, the number of the memory chips 332 included in the second memory module 301a is not limited thereto.

Although not illustrated in FIG. 10A, the same number (e.g., eight) of the second memory chips 332 may be mounted on a second surface of the second substrate 305 that is opposite to the first surface.

Referring to FIG. 10B, a second memory module 301b may include a controller 310b, a buffer 320b, and the plurality of second memory chips 332 that are mounted on the first surface of the second substrate 305.

The second memory module 301b of FIG. 10B may be substantially the same as the second memory module 301a of FIG. 10A, except that the buffer 320b is included in the controller 310b.

Although not illustrated in FIGS. 10A and 10B, the first memory module 201 may have a structure similar to that of the second memory module 301a or 301b. For example, the plurality of first memory chips 212 may be mounted on both surfaces of the first substrate 205. Additionally, the first memory module 201 may be implemented as one of an unbuffered DIMM (UDIMM), a registered DIMM (RDIMM) including a command/address register, a fully buffered DIMM (FBDIMM), a load reduced DIMM (LRDIMM) including a hub such as an advanced memory buffer (AMB), etc.

Figure 11:
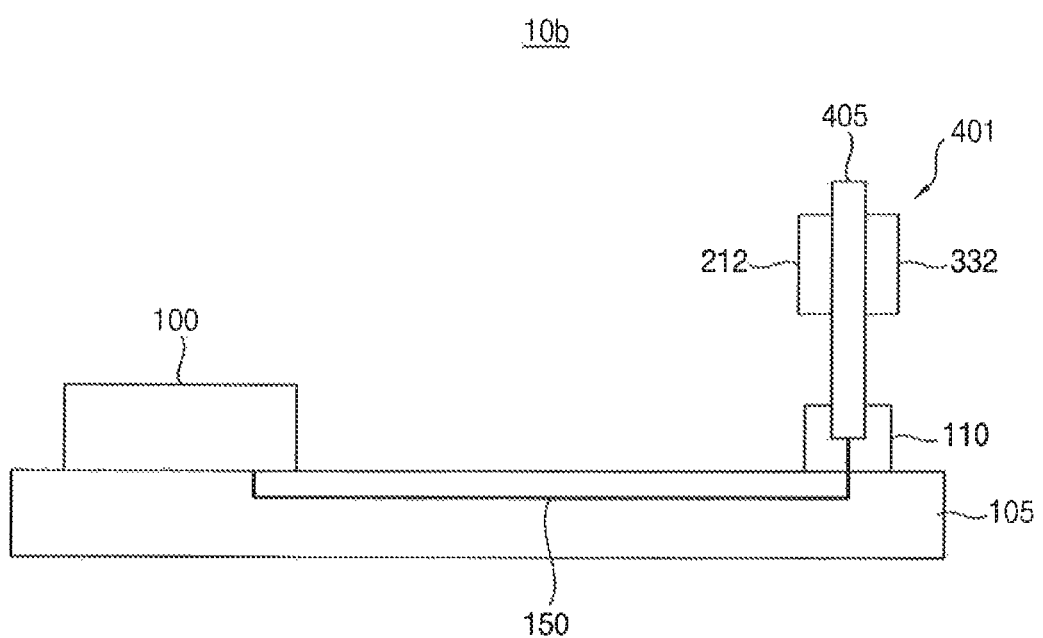
FIG. 11 is a cross-sectional view of a memory system including a memory device according to an exemplary embodiment of the inventive concept.

FIG. 11 is a cross-sectional view of a memory system including a memory device according to an exemplary embodiment of the inventive concept.

Referring to FIG. 11, a memory system 10b may include the host 100 and a memory module 401 that are mounted on the base substrate 105.

The memory system 10b of FIG. 11 may be substantially the same as the memory system 10a of FIG. 9, except that first and second memory modules 201 and 301 of FIG. 9 are integrated or combined into one memory module (e.g., a memory module 401).

For example, referring to FIGS. 1 and 11, the first memory device 210, the controller 310, the buffer 320, and the second memory device 330 may be included in the memory module 401.

The memory module 401 may include a substrate 405, the plurality of first memory chips 212, and the plurality of second memory chips 332. The plurality of first and second memory chips 212 and 332 may be mounted on the substrate 405. Although not illustrated in FIG. 11, the memory module 401 may further include the controller 310 and the buffer 320 of FIG. 1. The plurality of first memory chips 212 may correspond to the first memory device 210 in FIG. 1, and the plurality of second memory chips 332 may correspond to the second memory device 330 in FIG. 1.

According to exemplary embodiments of the inventive concept, the memory module 401 may be a DIMM in which the plurality of first memory chips 212 and the plurality of second memory chips 332 are mounted on both surfaces of the substrate 405. For example, the plurality of first memory chips 212 may be mounted on a first surface of the substrate 405. The controller 310 in FIG. 1, the buffer 320 in FIG. 1, and the plurality of second memory chips 332 may be mounted on a second surface of the substrate 405 that is opposite to the first surface. For example, the memory module 401 may be an integrated DIMM including both a volatile memory device and a nonvolatile memory device.

Although FIG. 9 illustrates an example where the memory system 10a includes one VDIMM and one NVDIMM, the memory system according to exemplary embodiments of the inventive concept may include a plurality of VDIMMs, a plurality of NVDIMMs, or a plurality of VDIMMs and NVDIMMs. Although FIG. 11 illustrates an example where the memory system 10b includes one integrated DIMM, the memory system according to exemplary embodiments of the inventive concept may include a plurality of integrated DIMMs.

Figure 12:
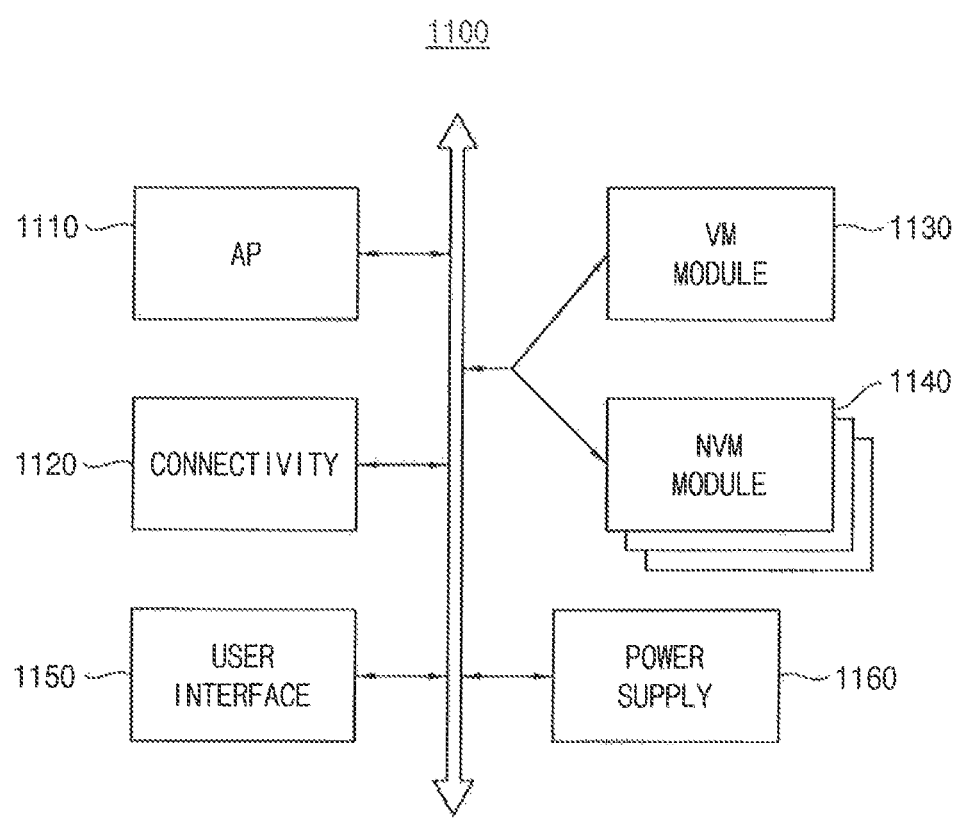
FIG. 12 is a block diagram illustrating a mobile system according to an exemplary embodiment of the inventive concept.

FIG. 12 is a block diagram illustrating a mobile system according to an exemplary embodiment of the inventive concept.

Referring to FIG. 12, a mobile system 1100 may include an AP 1110, a connectivity module 1120, a first memory module 1130, a second memory module 1140, a user interface 1150, and a power supply 1160.

The AP 1110 may perform various computational functions such as, for example, particular calculations and task executions. The AP 1110 may execute an operating system (OS) to drive the mobile system 1100, and may execute various applications for providing an internet browser, a game, a video, a camera, etc.

According to exemplary embodiments of the inventive concept, the AP 1110 may include a single processor core or multiple processor cores. According to an exemplary embodiment of the inventive concept, the AP 1110 may further include a cache memory that may be located inside or outside the AP 1110.

The connectivity module 1120 may communicate with an external device. The connectivity module 1120 may communicate using one of various types of communication interfaces such as, for example, universal serial bus (USB), Ethernet, near field communication (NFC), radio frequency identification (RFID), mobile telecommunications such as 4th generation (4G) and Long-Term Evolution (LTE), a memory card interface, etc. According to exemplary embodiments of the inventive concept, the connectivity module 1120 may include a baseband chipset, and may support one or more of a number of different communication technologies such as, for example, global system for mobile communications (GSM), general packet radio service (GPRS), wideband code division multiple access (WCDMA), high speed packet access (HSPA), etc.

The first and second memory modules 1130 and 1140 may operate as data storage for data processed by the AP 1110 or a working memory in the mobile system 1100. For example, the first and second memory modules 1130 and 1140 may store a boot image for booting the mobile system 1100, a file system for the OS to drive the mobile system 1100, a device driver for an external device connected to the mobile system 1100, and/or an application executed on the mobile system 1100.

According to exemplary embodiments of the inventive concept, the first memory module 1130 may include a volatile memory such as, for example, a DRAM, a SRAM, a mobile DRAM, a double data rate (DDR) synchronous DRAM (SDRAM), a low power DDR (LPDDR) SDRAM, a graphic DDR (GDDR) SDRAM, a Rambus DRAM (RDRAM), etc. According to exemplary embodiments of the inventive concept, the second memory module 1140 may include a nonvolatile memory such as, for example, an Electrically Erasable Programmable Read-Only Memory (EEPROM), a flash memory, a PRAM, an RRAM, an NFGM, a PoRAM, an MRAM, a FRAM, etc.

The AP 1110 and the first and second memory modules 1130 and 1140 may form a memory system according to an exemplary embodiment of the inventive concept. For example, the AP 1110 may operate as the host 100 in FIG. 1, the first memory module 1130 may include the first memory device 210 in FIG. 1, and the second memory module 1140 may include the controller 310, the buffer 320, and the second memory device 330 in FIG. 1. The first and second memory modules 1130 and 1140 may be connected to each other through a single channel (e.g., the channel 150 in FIG. 1).

When the first memory module 1130 receives a write command (e.g., WCMD1 in FIG. 1), information associated with a write address (e.g., WADDR1 in FIG. 1) and write data (e.g., WDAT1 in FIG. 1) may be recorded (e.g., logged) by a controller (e.g., the controller 310 in FIG. 1) included in the second memory module 1140 and may be stored into a buffer (e.g., the buffer 320 in FIG. 1) included in the second memory module 1140. Accordingly, it may be efficiently traced or recognized which data is modified among data stored in the first memory module 1130, and thus, the modified data (or the latest data) may be efficiently maintained or retained.

In addition, the write data may be collected or accumulated in the buffer, and then the collected or accumulated data may be stored into the second memory module 1140 at once in a certain situation (e.g., in the low power mode). Accordingly, the number of data write operations for the second memory module 1140 may be reduced, and thus, the second memory module 1140 may have relatively high endurance. The write data may be directly transmitted from the buffer to the second memory module 1140 without going through the AP 1110, and thus, the memory system and the mobile system 1100 may have relatively increased performance and high data transmission efficiency.

The user interface 1150 may include at least one input device such as, for example, a keypad, a button, a microphone, a touch screen, etc., and/or at least one output device such as, for example, a speaker, a display device, etc. The power supply 1160 may provide power to the mobile system 1100.

According to exemplary embodiments of the inventive concept, the mobile system 1100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation system, etc. The mobile system 1100 may further include a wearable device, an internet of things (IoT) device, an internet of everything (IoE) device, an e-book, a virtual reality (VR) device, a robotic device, etc.

Figure 13:
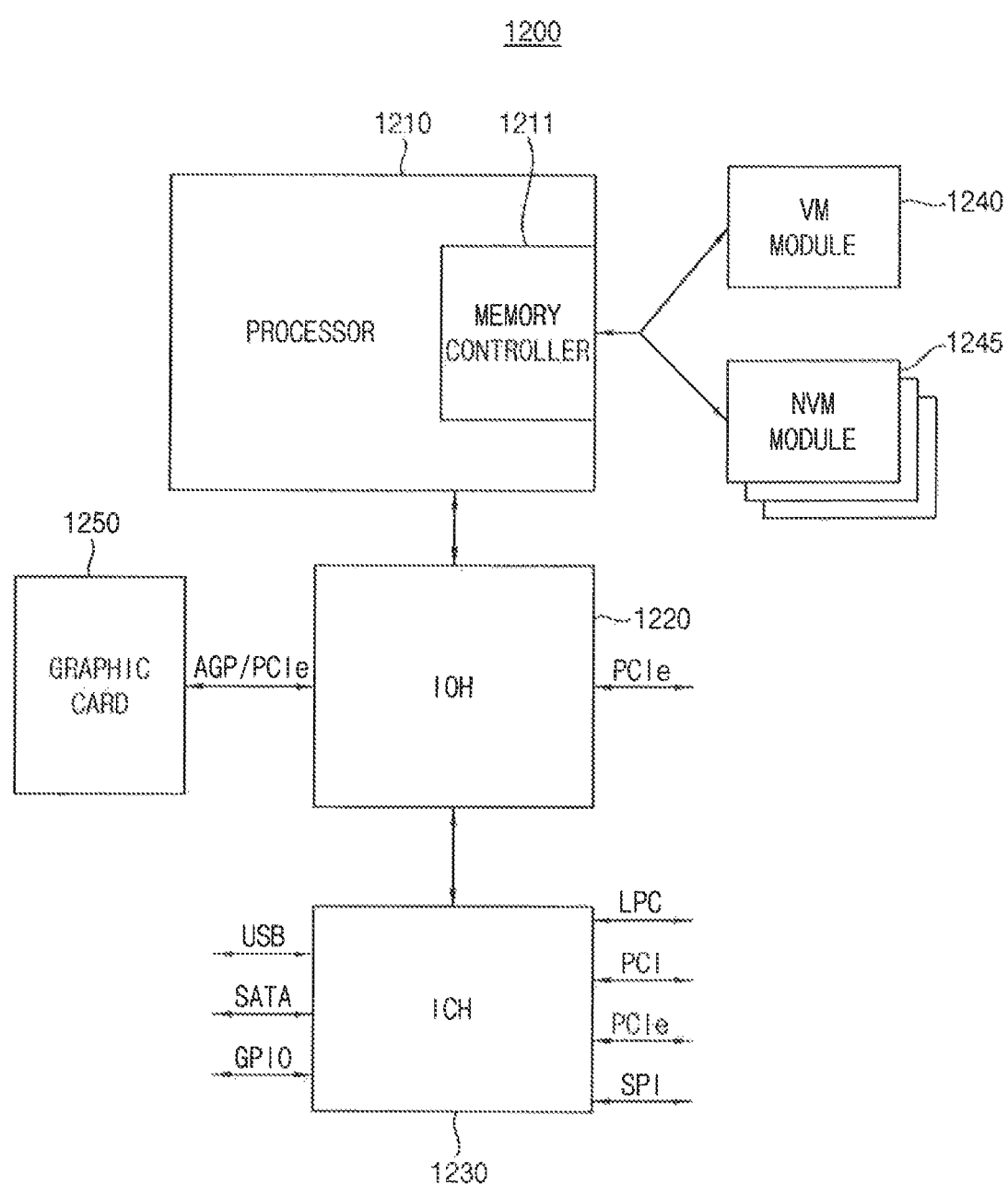
FIG. 13 is a block diagram illustrating a computing system according to an exemplary embodiment of the inventive concept.

FIG. 13 is a block diagram illustrating a computing system according to an exemplary embodiment of the inventive concept.

Referring to FIG. 13, a computing system 1200 includes a processor 1210, an input/output (I/O) hub 1220, an I/O controller hub 1230, a first memory module 1240, a second memory module 1245, and a graphic card 1250.

The processor 1210 may perform specific calculations or tasks. For example, the processor 1210 may be a microprocessor, a central processing unit (CPU), a digital signal processor, or the like.

According to exemplary embodiments of the inventive concept, the processor 1210 may include a single processor core or a plurality of processor cores. According to exemplary embodiments of the inventive concept, the processor 1210 may further include a cache memory located inside or outside the processor 1210. According to exemplary embodiments of the inventive concept, the computing system 1200 may include a plurality of processors.

The processor 1210 may include a memory controller 1211 that controls an operation of the first and second memory modules 1240 and 1245. The memory controller 1211 included in the processor 1210 may be referred to as an integrated memory controller (IMC). A memory interface between the memory controller 1211 and the first and second memory modules 1240 and 1245 may be implemented by one channel including a plurality of signal lines, or by a plurality of channels. Each channel may be coupled to at least one of the first and second memory modules 1240 and 1245. According to exemplary embodiments of the inventive concept, the memory controller 1211 may be included in the I/O hub 1220. The I/O hub 1220 including the memory controller 1211 may be referred to as a memory controller hub (MCH).

The first memory module 1240 may include a plurality of volatile memory devices that store data provided from the memory controller 1211. The second memory module 1245 may include a plurality of nonvolatile memory devices that store the data provided from the memory controller 1211.

The memory controller 1211 and the first and second memory modules 1240 and 1245 may form a memory system according to an exemplary embodiment of the inventive concept. The first and second memory modules 1240 and 1245 may be connected to each other through a single channel (e.g., the channel 150 of FIG. 1). When the first memory module 1240 receives a write command, information associated with a write address and write data may be recorded (e.g., logged) by a controller included in the second memory module 1245 and may be stored into a buffer included in the second memory module 1245. Accordingly, it may be efficiently traced or recognized which data is modified among data stored in the first memory module 1240, and thus, the modified data (or the latest data) may be efficiently maintained or retained.

In addition, the write data may be collected or accumulated in the buffer, and then the collected or accumulated data may be stored into the second memory module 1245 at once in a certain situation (e.g., in the low power mode). Accordingly, the number of data write operations for the second memory module 1245 may be reduced, and thus, the second memory module 1245 may have relatively high endurance. The write data may be directly transmitted from the buffer to the second memory module 1245 without going through the processor 1210, and thus, the memory system and the computing system 1200 may have relatively increased performance and high data transmission efficiency.

The I/O hub 1220 may manage data transfer between the processor 1210 and devices, such as the graphic card 1250. The I/O hub 1220 may be coupled to the processor 1210 via at least one of various interfaces, such as a front side bus (FSB), a system bus, a HyperTransport, a lightning data transport (LDT), a QuickPath interconnect (QPI), a common system interface (CSI), etc. According to exemplary embodiments of the inventive concept, the computing system 1200 may include a plurality of I/O hubs.

The I/O hub 1220 may provide various interfaces with the devices. For example, the I/O hub 1220 may provide an accelerated graphics port (AGP) interface, a peripheral component interconnect express (PCIe) interface, a communications streaming architecture (CSA) interface, etc.

The graphic card 1250 may be coupled to the I/O hub 1220 via, for example, the AGP or the PCIe interface. The graphic card 1250 may control a display device for displaying an image. The graphic card 1250 may include an internal processor and an internal memory to process the image. According to exemplary embodiments of the inventive concept, the I/O hub 1220 may include an internal graphic device along with or instead of the graphic card 1250. The internal graphic device may be referred to as integrated graphics, and the I/O hub 1220 including the memory controller 1211 and the internal graphic device may be referred to as a graphics and memory controller hub (GMCH).

The I/O controller hub 1230 may perform data buffering and interface arbitration to efficiently operate various system interfaces. The I/O controller hub 1230 may be coupled to the I/O hub 1220 via an internal bus. For example, the I/O controller hub 1230 may be coupled to the I/O hub 1220 via at least one of various interfaces, such as a direct media interface (DMI), a hub interface, an enterprise Southbridge interface (ESI), PCIe, etc.

The I/O controller hub 1230 may provide various interfaces with peripheral devices. For example, the I/O controller hub 1230 may provide a universal serial bus (USB) port, a serial advanced technology attachment (SATA) port, a general purpose input/output (GPIO), a low pin count (LPC) bus, a serial peripheral interface (SPI), a PCI, a PCIe, etc.

According to exemplary embodiments of the inventive concept, the processor 1210, the I/O hub 1220, and the I/O controller hub 1230 may be implemented as separate chipsets or separate integrated circuits. According to exemplary embodiments of the inventive concept, at least two of the processor 1210, the I/O hub 1220, and the I/O controller hub 1230 may be implemented as one chipset.

According to exemplary embodiments of the inventive concept, the computing system 1200 may be any computing system, such as a personal computer (PC), a server computer, a workstation, a tablet computer, a laptop computer, a mobile phone, a smart phone, a PDA, a PMP, a digital camera, a digital television, a set-top box, a music player, a portable game console, a navigation device, etc.

According to exemplary embodiments of the inventive concept, the memory system 10 of FIG. 1, the mobile system 1100 of FIG. 12, the computing system 1200 of FIG. 13, and/or components thereof may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

As will be appreciated by those skilled in the art, the present inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

The present inventive concept may be applied to various devices and systems that include memory devices. For example, as described above, the present disclosure may be applied to systems such as be a mobile phone, a smart phone, a PDA, a PMP, a digital camera, a camcorder, a PC, a server computer, a workstation, a laptop computer, a digital TV, a set-top box, a portable game console, a navigation system, etc.

As described above, in the method of operating the memory device according to exemplary embodiments of the inventive concept, when the first memory device receives the write command, information associated with the write address and the write data may be recorded (e.g., logged) by the controller for controlling the second memory device and may be stored into the buffer. Accordingly, it may be efficiently traced or recognized which data is modified among data stored in the first memory device, and thus, the modified data (or the latest data) may be efficiently maintained or retained.

In addition, the write data may be collected or accumulated in the buffer, and then the collected or accumulated data may be stored into the second memory device at once in a certain situation (e.g., in the low power mode). Accordingly, the number of data write operations for the second memory device may be reduced, and thus, the second memory device may have relatively high endurance. The write data may be directly transmitted from the buffer to the second memory device without going through the first memory device and/or the host, and thus, the memory system may have relatively increased performance and high data transmission efficiency.

While the inventive concept has been shown and described with reference to the exemplary embodiments thereof, it will be understood by those of ordinary skill in the art that various changes in form and details may be made thereto without departing from the spirit and scope of the present inventive concept as defined by the following claims.

What is claimed is:

1. A method of operating a memory device, the method comprising:
receiving, at a first memory device, a first write command, a first write address, and first write data through a channel;
sensing, at a controller, the first write command received at the first memory device, wherein the controller is connected to the channel and configured to control a second memory device, and the first memory device and the second memory device are different types of memory devices;
generating a first write log using the first write address and the first write data, when the first write command is sensed by the controller; and
storing the first write log in a buffer.

2. The method of claim 1, wherein generating the first write log comprises:
mapping the first write address, corresponding to the first memory device, to a second write address, corresponding to the second memory device;
generating a first flag for the first write data; and
generating the first write log comprising the first flag, the second write address, and the first write data.

3. The method of claim 2, wherein generating the first flag comprises:
setting the first flag to a first logic level when it is not required to store the first write data into the second memory device; and
setting the first flag to a second logic level when it is required to store the first write data into the second memory device.

4. The method of claim 1, wherein storing the first write log in the buffer comprises:
determining a storage capacity of the buffer;
deleting some of a plurality of write logs stored in the buffer when it is determined that the storage capacity of the buffer is insufficient to store the first write log; and
recording the first write log into the buffer when it is determined that the storage capacity of the buffer is sufficient to store the first write log.

5. The method of claim 4, wherein each of the plurality of write logs stored in the buffer includes a flag, a write address, and write data,
wherein the plurality of write logs stored in the buffer are divided into a first group of write logs where flags of the first group of write logs are set to a first logic level and a second group of write logs where flags of the second group of write logs are set to a second logic level, and
wherein deleting some of the plurality of write logs stored in the buffer comprises:
deleting at least one write log included in the first group.

6. The method of claim 5, wherein deleting the at least one write log included in the first group comprises:
deleting a least recently used (LRU) write log included in the first group.

7. The method of claim 2, further comprising:
storing the first write data in the second memory device using the first write log stored in the buffer.

8. The method of claim 7, wherein the first write data is stored in the second memory device using the first flag,
the first write data is not stored into the second memory device when the first flag is set to a first logic level, and
the first write data is stored into the second memory device by directly transmitting the first write data from the buffer to the second memory device using the second write address when the first flag is set to a second logic level.

9. The method of claim 7, wherein when the first memory device and the second memory device enter a low power mode, the first write data is stored in the second memory device.

10. The method of claim 1, wherein the second memory device, the controller, and the buffer are included in one memory module.

11. The method of claim 10, wherein the one memory module is a dual in-line memory module (DIMM).

12. The method of claim 10, wherein the buffer is included in the controller.

13. The method of claim 1, wherein the first memory device, the second memory device, the controller, and the buffer are included in one memory module.

14. The method of claim 13, wherein the one memory module further comprises a printed circuit board (PCB),
wherein the first memory device is mounted on a first surface of the PCB, and
wherein the second memory device, the controller, and the buffer are mounted on a second surface of the PCB that is opposite to the first surface.

15. The method of claim 1, wherein the first memory device is a volatile memory device and the second memory device is a nonvolatile memory device.

16. A method of operating a memory device, the method comprising:
transmitting a first write command, a first write address, and first write data to a first memory device;
sensing the first write command that is transmitted to the first memory device and activating a sensing signal;
mapping a first write address, corresponding to the first memory device, to a second write address, corresponding to a second memory device, in response to the sensing signal;
setting a first flag to a first or second logic level depending on whether it is required to store the first write data into the second memory device;
generating a first write log comprising the first flag, the second write address, and the first write data; and
storing the first write log in a buffer by using a buffer management table.

17. The method of claim 16, further comprising:
changing the first flag from the first logic level to the second logic level when the first write data is no longer stored in the first memory device.

18. The method of claim 16, further comprising:
activating a command to empty the buffer; and
storing the first write data of the first write log in the second memory device when the first flag has the second logic level, in response to the command.

19. A memory system comprising:
a first memory device connected to a channel and configured to receive a first write command, a first write address, and first write data through the channel;
a controller connected to the channel and configured to control a second memory device, sense the first write command received by the first memory device, and when the first write command is sensed, generate a first write log using the first write address and the first write data; and a buffer configured to store the first write log, wherein the first memory device and the second memory device are different types of memory devices.

20. The memory system of claim 19, wherein the buffer is included in the controller, the first memory device comprises a plurality of first memory chips, the second memory device comprises a plurality of second memory chips, the plurality of first memory chips are mounted on a first surface of a substrate, and the plurality of second memory chips are mounted on a second surface of a substrate that is opposite to the first surface.

* * * * *